United States Patent [19]

Jeppsson

[11] Patent Number: 5,419,237
[45] Date of Patent: May 30, 1995

[54] PNEUMATIC ACTUATOR FOR BUTTERFLY VALVES

[76] Inventor: Håkan Jeppsson, Tranebaervej 35, DK-9530 Støvring, Denmark

[21] Appl. No.: 141,079

[22] Filed: Oct. 26, 1993

[51] Int. Cl.⁶ .................................. F01B 3/00
[52] U.S. Cl. .......................... 92/31; 74/99 A
[58] Field of Search ............... 92/31, 32, 33, 116; 251/252, 253; 74/99 A

[56] References Cited

U.S. PATENT DOCUMENTS

| | | | |
|---|---|---|---|
| 3,450,382 | 6/1969 | Calim | 92/31 |
| 4,120,479 | 10/1978 | Thompson et al. | 251/252 |
| 4,504,038 | 3/1985 | King | 251/253 |
| 4,651,969 | 3/1987 | Dowdall | 92/33 |
| 5,108,073 | 4/1992 | Adachi | 251/252 |
| 5,134,923 | 8/1992 | Wexler | 92/31 |

FOREIGN PATENT DOCUMENTS

| | | | |
|---|---|---|---|
| 1300382 | 8/1969 | Germany | 92/31 |
| 0001455 | 1/1985 | Japan | 74/99 A |

*Primary Examiner*—Thomas E. Denion
*Attorney, Agent, or Firm*—Antonelli, Terry, Stout & Kraus

[57] ABSTRACT

For transmission of an axial movement of an activation piston (10), as a rotary movement of an output shaft (22) is used an intermediate tube sleeve (16) which is picked up non-turnably, yet displaceably, inside a fixed tube section (4) of an actuator housing (2,6). The tube sleeve (16) has opposed axial tracks (20) to catch a cross-pin (18) on the fixed tube section and also a helical track (26) to catch a projecting tap (24) on the output shaft (22). All pertinent wear and tear will appear on the tube sleeve and the applied taps, and these parts will be easy to replace in addition to which they may be produced in a wear resistant embodiment.

6 Claims, 1 Drawing Sheet

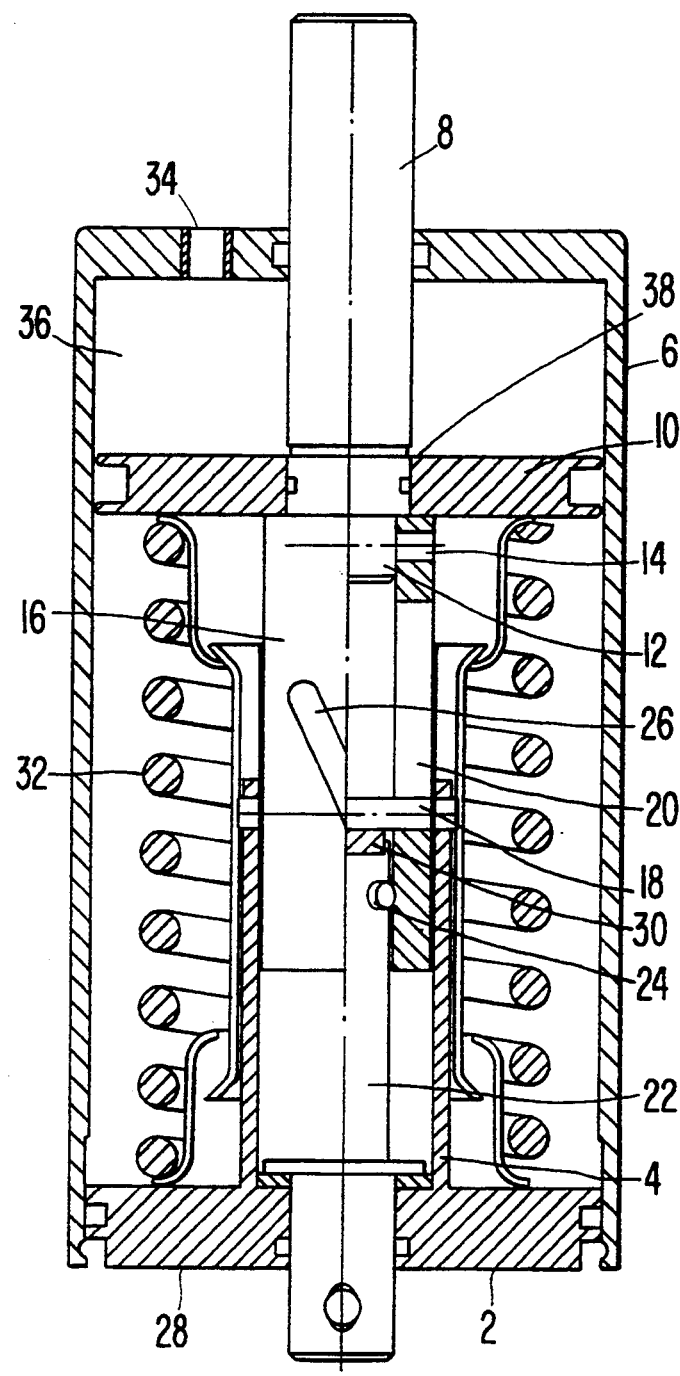

PNEUMATIC ACTUATOR FOR BUTTERFLY VALVES

The present invention relates to a pressure medium driven actuator for operating butterfly valves. These valves are widely used within the processing industry, and correspondingly the pneumatic actuators are to be produced in large batches, which may even be still larger, in that one or same actuator type may be used for valves of varied dimensions.

The actuators work according to the simple principle of a pneumatic piston being activated to shoot down into a cylinder whereby a cam controlled mechanism produces a turning of an output spindle connected to the rotary spindle of the butterfly valve. This activation also brings about a compression of a compression spring which subsequently can effect the valve to return to neutral position once the air pressure on the piston is relieved.

The known actuators are quite complex, e.g. making it difficult to perform a replacement therein of worn out parts, and the aim of the invention is to provide an actuator of simple design so that it may be economically manufactured and be robust and reliable in operation.

An actuator according to the invention is shown on the drawing. A bottom cover 2 is integrally prepared with a centrally upright tube member 4 and is placed as a bottom of an upper cylinder housing 6. A rod 8 penetrates the top portion of this housing carrying a piston 10, and below this it continues in a pin portion 12 to which, by means of a cross pin 14, is coupled a downwardly projecting tube sleeve 16. This sleeve protrudes partly down the tube 4 and is axial-displaceably, yet non-turnably connected to this tube by means of a fixed cross-pin 18, which is pegged into the opposed wholes at the upper end of the tube 4 and extends through opposed axial notches 20 in the sleeve 16.

Inside the tube 4 a rotary output shaft 22 is embedded, the lower end of which projects through the bottom cover 2 whilst at its top it protrudes partly up the sleeve 16, and near its upper end it exhibits a unilaterally projecting pin 24 which interlocks with a cam engagement with a helical track 26 in the sleeve wall 16.

In the axial direction, the shaft 22 is held between two axial thrust bearings 28 and 30 embedded, respectively, in the bottom cover 2 and just below the pin 18, which will thus also serve to keep the shaft with associated bearings in place.

Between the bottom cover 2 and the underside of the piston 10 a compression spring 32 is inserted. When compressed air is led through an upper nozzle pipe 34 to the cavity 36 above the piston 10, the piston is pressed down during compression of the spring, and by means of the associated downward movement of the tube sleeve 16, the helical track 26 will force the shaft 22 to turn by means of the pin 24. When the compressed air is released the spring 32 effects the reverse motion.

Because the entire mechanism is placed in the center with the spring positioned externally all parts of the mechanism may have a small diameter, and thus the consumption of material and the weight will be reduced. Another advantage attained has been to create adequate room for the illustrated holding device for the spring. The spring holder prevents the spring from sudden expansion during the dismounting of same. The small compact turn-mechanism thusly contributes to the enhancement of the safety level during dismounting service.

Another important advantage attained by this invention is that all wear and tear is limited to a few parts. Apart from sealing rings of rubber and the two shaft bearings only one wearprone part remains, viz. the tube sleeve 16. Both the helical track creating the turning movement as well as the axial track absorbing the thrust of the turning movement are provided in this sleeve. This entails that the wearing is concentrated to the sleeve, which is preferably made of a corrosion-resistant material with good properties to withstand wear and a small coefficient of friction.

Another great advantage of the invention is that assembly and disassembly are very easily performed. To disassemble the pneumatic actuator the cylinder housing 6 is loosened from the bottom cover 2 following which a lock ring 38 holding the piston 10 is taken off. The spring 32 together with its spring holding devices are now removed. By dismounting the pins 18,14 and then 24, all parts have then been dismantled. Through the uncomplicated disassembly and correspondingly simple re-assembly the service time consumption may be reduced.

The actuator according to the invention is well-suited to be produced with a view to use in humid surroundings.

I claim:

1. A pneumatic actuator for butterfly valves, comprising a cylindric housing having a top end and a bottom end, a piston located adjacent the top end, a rotary output shaft projecting downwardly from the bottom end, inlet means for compressed air for driving the piston one way in said cylindric housing and spring means for urging the piston the opposite way, and movement conversion means located between the piston and the output shaft for converting respective axial movements of the piston in an axial direction into respective rotations of the output shaft; said movement conversion means comprising a fixed tube part upstanding from the bottom end of the housing and a downwardly open sleeve member depending from the piston so as to be axially slidably received in the tube part and so as to centrally receive the upper end of the output shaft in an axially slidable manner, said sleeve member being operable to respond to axial movement of the piston by effecting rotation of the output shaft by means of a pin and groove engagement system between the tube part, the sleeve and the output shaft, which engagement system comprises both a first groove type being oblique relatively to said axial direction and a second groove type which is non-oblique relative to said axial direction, and wherein the grooves of both said first and said second type are provided in the wall of the sleeve member and are engaged by the pin means in rigid connection with the tube part and the output shaft, respectively.

2. An actuator according to claim 1, in which the non-oblique groove type comprises two opposed axially extending grooves in the sleeve cooperating with a cross pin mounted in opposed holes of the wall of the tube part near the upper end thereof.

3. An actuator according to claim 1, in which the output shaft cooperates with its associated sleeve groove by means of a monolaterally projecting pin.

4. An actuator according to claim 1, in which the spring means are arranged as a compression spring located directly between the lower side of the piston and the top side of the bottom end of the cylindric housing, the latter being of straight cylindrical shape.

5. An actuator according to claim 4, in which the compression spring is mounted in a spring retainer system having an inner tubular portion fitting over the said tube part.

6. An actuator according to claim 1, in which the said tube part is made integrally with the bottom end portion of the cylindrical housing.

* * * * *